United States Patent [19]

Kluth

[11] Patent Number: 4,667,234
[45] Date of Patent: May 19, 1987

[54] CIRCUIT FOR INCREASING THE SLOPES OF A VIDEO SIGNAL

[75] Inventor: Hans-Jürgen Kluth, Villingen-Schwenningen, Fed. Rep. of Germany

[73] Assignee: Deutsche Thomson-Brandt GmbH, Hanover, Fed. Rep. of Germany

[21] Appl. No.: 690,759

[22] Filed: Jan. 11, 1985

[30] Foreign Application Priority Data

Jan. 11, 1984 [DE] Fed. Rep. of Germany ....... 3400674

[51] Int. Cl.$^4$ ............................................. H04N 5/208
[52] U.S. Cl. ..................................... 358/166; 358/167; 358/37
[58] Field of Search ................... 358/166, 37, 167, 36, 358/170

[56] References Cited

U.S. PATENT DOCUMENTS

| | | | |
|---|---|---|---|
| 4,030,121 | 6/1977 | Faroudja | 358/37 |
| 4,047,108 | 9/1977 | Bijher et al. | 375/38 |
| 4,295,164 | 10/1981 | Rauser | 358/166 |
| 4,414,564 | 11/1983 | Hitchcock | 358/166 X |

FOREIGN PATENT DOCUMENTS

| | | |
|---|---|---|
| 1039842 | 9/1958 | Fed. Rep. of Germany . |
| 3226432 | 1/1984 | Fed. Rep. of Germany . |

Primary Examiner—James J. Groody
Assistant Examiner—E. Anne Toth
Attorney, Agent, or Firm—Horst M. Kasper

[57] ABSTRACT

The circuit provides a correction signal generated by two-fold differentiation of the video signal which is then added to the video signal. According to the invention, a high pass filter is disposed in the path of the correction signal. The corrected video signal is limited to the black level value and to the white level value with the amplitude limiters. This assures the optimum operational mode of the circuit independent of the frequency course of the frequencies of the video signal in each case.

20 Claims, 4 Drawing Figures

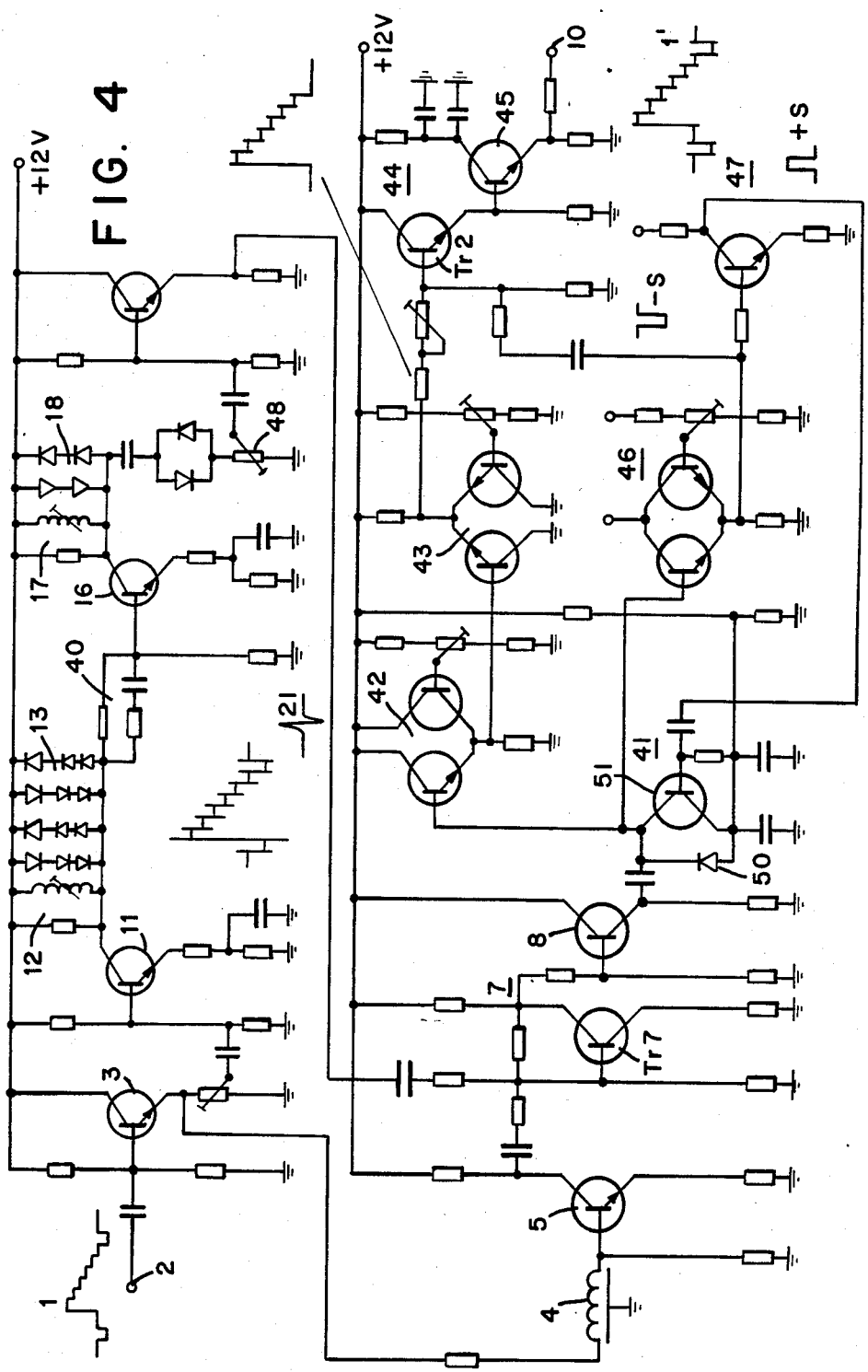

CIRCUIT FOR INCREASING THE SLOPES OF A VIDEO SIGNAL

BACKGROUND OF THE INVENTION

1. Field of the Invention

The present invention provides a circuit for increasing the steepness of the rise of the pulses of a video signal.

2. Brief Description of the Background of the Invention Including Prior Art

Video signals for a defect free reproduction of pictures in a color television set in general have a video band width of about 5 MHz. It is possible in practice that a video signal has a smaller band width of 2 to 3 MHz, for example in the case of the scanning of poor films, in the case of simple cameras, in the case of the reproduction of recording apparatus with a lower band width or in the case with limited transmission sections. Such a lower band width means that during reproduction there is a decreased sharpness of the picture, in particular relating to the vertical edges of the picture.

It is known to improve the sharpness in such a signal by processing the video signal. A correction signal is added to the video signal in differential equalizers, which are employed for this purpose, and the correction signal is obtained by two-fold differentiation of the video signal. This causes a steeper rise of the video signal pulses which run too flat because of the band width limitations.

If in the case of such a circuit the amplitude of the correction signal is of an optimum value for small signal jumps, then in the case of larger signal jumps very high voltage peaks can occur in the corrected video signal, which voltage peaks effect a subjective deterioration of the picture or can interfere with the synchronization.

It is known for the purpose of avoiding these disadvantages from German Patent DE-PS No. 3,141,761 to coordinate to each of the two differentiation stages for obtaining the correction signal an amplitude limiter dimensioned such that in the case of large signals jumps in the video signal there is no pulse peak in the corrected video signal which would lower the quality of the picture reproduction or would interfere with synchronization.

The effect of such a circuit depends on the frequency dependence of the offered video signal. Depending on frequency dependence there can occur an undercompensation or an overcompensation of the video signal. In the case of an undercompensation a sufficient increase in the sharpness of the picture is not achieved, whereas in the case of an overcompensation the over emphasis of the edges can also lead to a subjectively observed deterioration of the picture.

A circuit for increasing the steepness of the rise of the slopes of a video signal is described in the German Patent Application Laid Open DE-OS No. 3,226,432. According to this teaching, a high pass filter is coordinated into the signal path of the correction signal in order to avoid the taking into account of low frequencies in the correction. This occurs in order to avoid the appearance of plastic effects in a picture. The high amplitudes at high frequencies are increased in this case before applying the first differentiation.

A method for the artificial increase of contrast at the sound value jumps and the contours in stereotype plates produced with electronic electrotype machines is taught in the German Patent Application Laid-Out DE-AS No. 1,039,842. In this case, a video signal is limited with an amplitude limiter. This is done in order to obtain sharp edges during printing. The reproduction in this case refers to pictures which do not move. In this case the time constants are very large, and the method and teaching provided in this reference are not suitable for improving the signal jumps of moving pictures.

SUMMARY OF THE INVENTION

1. Purposes of the Invention

It is an object of the present invention to provide a circuit which is improved such that independent of the frequency dependence of an input video signal there is obtained an optimum improvement of the signal resulting in an increase in the sharpness of the picture. It is another object of the invention to provide an equalization of a video signal resulting in an improved video picture.

It is a further object of the present invention to provide a method which separates a synchronization signal and adds this signal after a correction of the video has been performed.

These and other objects and advantages of the present invention will become evident from the description which follows.

2. Brief Description of the Invention

The present invention provides a circuit for increasing the steepness of the rise of the pulses of a video signal which comprises an amplifier having an input for receiving a video signal requiring correction and having an output connected to the input of a first differential stage whose output is connected to the input of a high pass filter. The high pass filter provides an amplitude increase with increasing frequencies, and has an output which is connected to the input of an adding stage which also has an input connected to an output of the amplifier and has an output connected to an amplitude limiting means for limiting a corrected output signal to the black level value and to the white level value.

In the circuit for increasing the steepness of the rise of the pulses of a video signal according to present invention, the amplitude limiting means can include two amplitude limiting members.

A second amplitude limiting means can have its input connected to the output of the differential amplifier and its output connected to the high pass filter.

A third amplitude limiting means can have its input connected to the output of the high pass filter via the second differential stage and its output connected to the adding stage.

A second differential stage can have an input connected to the output of the high pass filter such that the high pass filter is disposed between the first and the second differential stage. The second differential stage can have an output connected to the input of the third amplitude limiting means which has its output connected to the high pass filter via the adding stage.

The circuit according to the present invention can further comprise a clamping stage which has an input connected to the adding stage and an output connected to an input of the amplitude limiting means. The clamping stage can comprise a clamping diode and a transistor disposed in parallel to the clamping diode, which transistor is controlled in its conductance by separated synchronous pulses.

The circuit can further comprise means for separating synchronizing pulses having an input connected to the output of the adding means and having an output connected to the input of a second adding stage which has a further input connected to the output of the amplitude limiting means in order to join the synchronizing pulses to the corrected signal. The output of the second adding stage can be connected to an input of an amplifier.

The circuit can further comprise a reversing stage having an input connected to the means for separating synchronizing pulses and having an output and a clamping stage having an input connected to the adding stage and an input connected to the means for separating synchronizing pulses and an output connected to an input of the amplitude limiting means and to the means for separating synchronizing pulses.

The circuit of the present invention can lift the amplitude level for increasing frequencies amounts to from about 2 to 10 dB for about a tripling of the frequency from about 1 MHz to 3 MHz.

The circuit can further comprise a delay time member having an input connected to an output of the amplifier and an output connected to the adding stage.

The amplitude limiting means of the circuit can comprise one section for limiting the black level value and a second section for limiting the white level value.

An amplitude adjustment means can be disposed in the connection between the high pass filter and the adding stage.

The high pass filter can comprise a network where one line incorporates a resistor which is bypassed by a series connection of a capacitance and another resistor and where a further resistor is provided between said line and the ground.

The circuit of the present invention can be employed for picture transmission at a rate of at least about one frame per second and preferably of at least about 20 frames per second. More preferred is the operation at a frequency corresponding to the frequency of the alternating current of an electric power grid. The components of the circuit are to provided of a sufficient speed to meet the requirements of the speed of changing the picture frames.

According to another aspect of the present invention, there is provided a method for increasing the steepness of the rise of the pulses of a video signal which comprises differentiating a video signal in a first differential stage, filtering with a high pass filter the output of a first differential stage for lifting the amplitudes of a signal at higher frequencies, differentiating the output of the high pass filter in a second differentiating stage for obtaining a correction signal, adding the correction signal to a video signal in an adding stage and limiting the corrected signal with two amplitude limiting means to the black level value and to the white level value.

The corrected signal can be clamped in a clamping stage to a synchronizing level before the signal reaches the amplitude limiting means. The signal can be fed through the clamping stage via a clamping diode and a transistor disposed in parallel to the diode, where the transistor is maintained in a conducting state by synchronizing pulses removed by limiting the signal to a black level value. Synchronizing pulses removed by limiting the signal to the black level value can again be added to the corrected signal after the signal has passed the amplitude limiting means. The lifting of the amplitude in the range of 1 to 3 MHz amounts to from about 3 to 5 dB.

The correction signal is initially increased toward higher frequencies because the high pass filter is in the path of the correction signal. Based on this, initially an overcompensation occurs during the addition of the correction signal to the offered video signal, that is, the signal amplitudes are excessively high at high frequencies. This overcompensation is later eliminated by again limiting the amplitudes to the black level value and to the white level value. The circuit becomes substantially independent of the frequency dependence of the video signal offered in the input because of the lifting of the amplitudes at the the high frequencies in the path of the correction signal and because of the following limitation of the amplitudes. This occurs because the lifting of the amplitudes and their limitation practically always result in a full use of the whole amplitude range. The limitation thus provides a stabilizing effect on the signal amplitude at high video frequencies. Not only are the amplitudes at high frequencies fully regenerated, in addition, for example, a sinusoidal signal part is transformed into a more or less rectangular signal part because of the limitation. This again achieves an increase in the sharpness of the picture.

A further advantage results in the processing of video signals from a video recorder. Here variations in the amplitude of the luminance density signal Y in the case of higher frequencies become ineffective because of the amplitude limiting according to the invention, and so-called edge disturbances and edge wiggle are reduced considerably.

The novel features which are considered as characteristic for the invention are set forth in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

In the accompanying drawing, in which are shown several of the various possible embodiments of the present invention:

FIG. 4 is a complete circuit for the block circuit diagram of FIG. 1.

DESCRIPTION OF INVENTION AND PREFERRED EMBODIMENT

Figure 1:
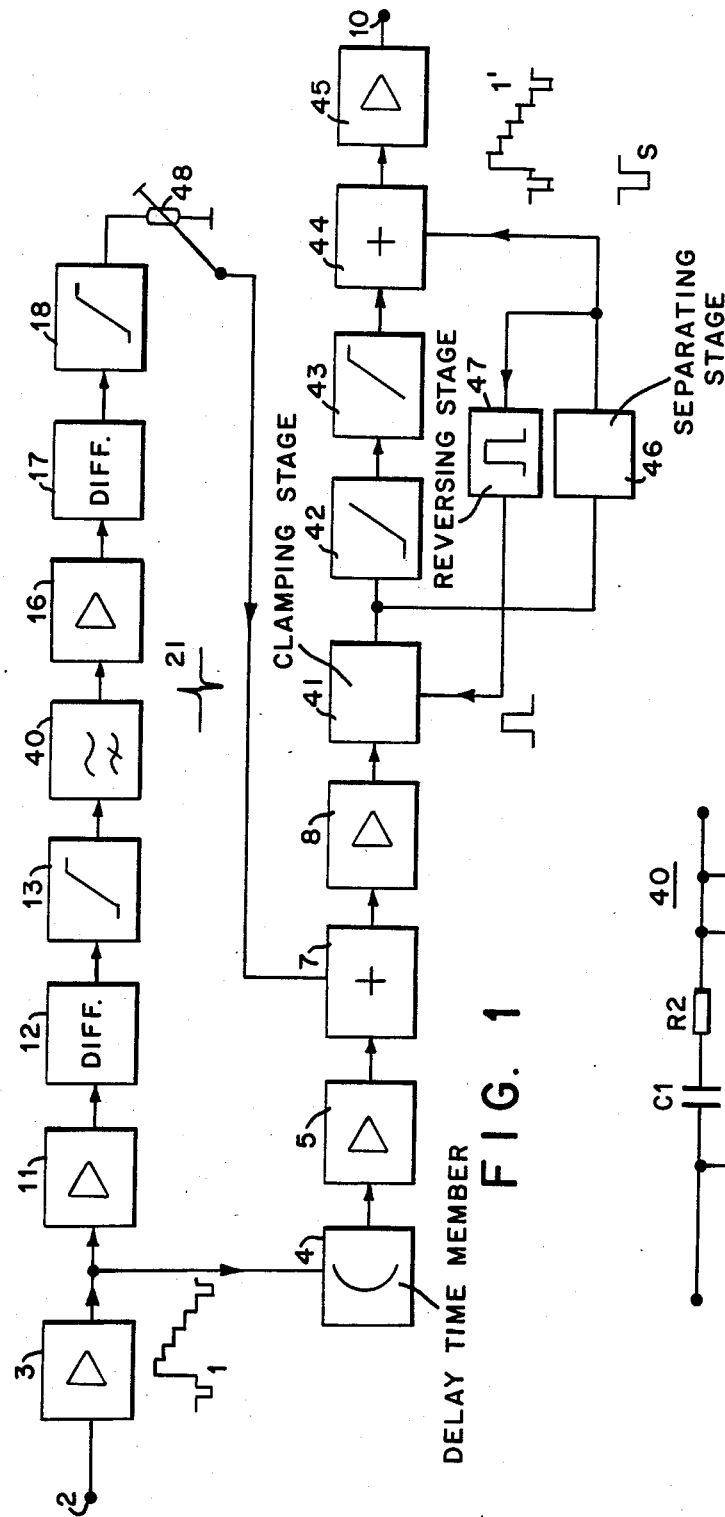
FIG. 1 is a view of a block circuit diagram of the circuit according to present invention.

In accordance with the present invention there is provided a circuit for the increase in the rise of the flanks of a video signal 1 where a correction signal 21 is obtained by a two-fold differentiation of the video signal 1 and where a correction signal 21 is added to the original signal in an adding stage 7 to provide a corrected signal 1'. Means 13, 18 are provided for limiting the amplitude of the correction signal 21, and the path of the correction signal includes a high pass filter 40. The high pass filter 40 is disposed behind the first differentiation stage 12 and lift up the amplitudes of the signal with increasing frequency. The corrected signal 1' is limited to the black level value and the white level value with two amplitude limiters 42 and 43.

The high pass filter 40 is preferably disposed between the two successive differentiation stages 12 and 17. The corrected signal 1' is preferably clamped in a clamping stage to the synchronizing level ahead of the amplitude limiters 42, 43. The clamping stage 41 comprises a clamping diode 50 and, in parallel to the clamping diode, a transistor 51 which is controlled to conduct by the separated synchronizing pulses S. The synchronizing pulses S are removed by limiting to the black value and to the white value in the amplitude limiters 42 and 43 and they are added in a following adding stage to the corrected signal. The increase of the amplitude in the high pass filter in the frequency range of from about 1 to 3 MHz can be from about 2 to 10 dB. and is preferably from about 3 to 5 dB.

Referring now to FIG. 1, the uncorrected video signal 1 passes from the terminal 2 via the amplifier 3 to the delay time member 4 and from there via the amplifier 5 to the adding stage 7. In addition, the video signal 1 passes via the amplifier 11 and the first differentiation stage 12 to the first amplitude limiter 13. The one time differentiated video signal passes to the high pass filter 40 which effects an increase of the signal amplitude with increasing video frequency. The thus differentiated video signal, which is increased in its amplitude at high frequency, passes via the amplifier 16 and the second differentiation stage 17 to the amplitude limiter 18. The correcting signal 21 obtained at the output of the amplitude limiter 18 is fed to the adding stage 7 with an amplitude adjustable via the potentiometer 48, and it is there added to the video signal. This circuit without the high pass filter 40 is described in more detail in German Patent No. 3,140,761. The corrected video signal at the output of the adding stage 7 passes via the amplifier 8 to the clamping stage 41 and is clamped to the synchronizing level.

The clamped video signal at the output of the clamping stage 41 is limited in the amplitude limiter 42 to the black level value and in the amplitude limiter 43 to the white level value. The video signal is then fed to the adding stage 44. The limiting to the black level value in the stage 42 eliminates the synchronizing pulses S present in the ultra-black region. The synchronizing pulse S is separated from the signal at the output of the clamping stage 41 with the synchronizing signal separating stage 46, and it is again added to the video signal in the adding stage 44. The thus corrected video signal 1' which is again provided with synchronizing pulses S, passes via the amplifier 45 to the output terminal 10. The synchronizing pulse S at the output of the separating stage 46 in addition effects a scanned clamping in the clamping stage 41 via the reversing stage 47.

Figure 2:
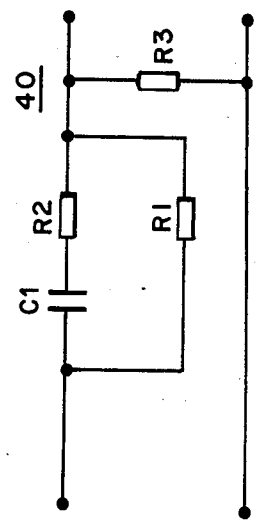
FIG. 2 is a view of a circuit for a high pass filter.

A practical embodiment for the high pass filter 40 of FIG. 1 is shown in FIG. 2. The components illustrated can have the following values.
capacitor C1: 180 pF–1.8 nF
resistor R1: 3.9 kOhm
resistor R2: 470 Ohm
resistor R3: 4.7 kOhm The value of the capacitor C1 depends on the desired transmission curve of the high pass filter 40. In the case of a value of the capacitance C1 of 180 pF, there results an amplitude increase by about 4 dB. at frequencies between 1 and 3 MHz, whereas in the case of a capacitance C1 equal to 1.8 nF, an amplitude increase by 4 dB occurs between 0.1 and 3 MHz.

The video signal 1 with a band width of 3 MHZ present at the terminal 2 and which is corrected, is shown in FIG. 3a. The signals are shown as voltages on the ordinate and are plotted against a time scale on the abcissa.

Figure 3:
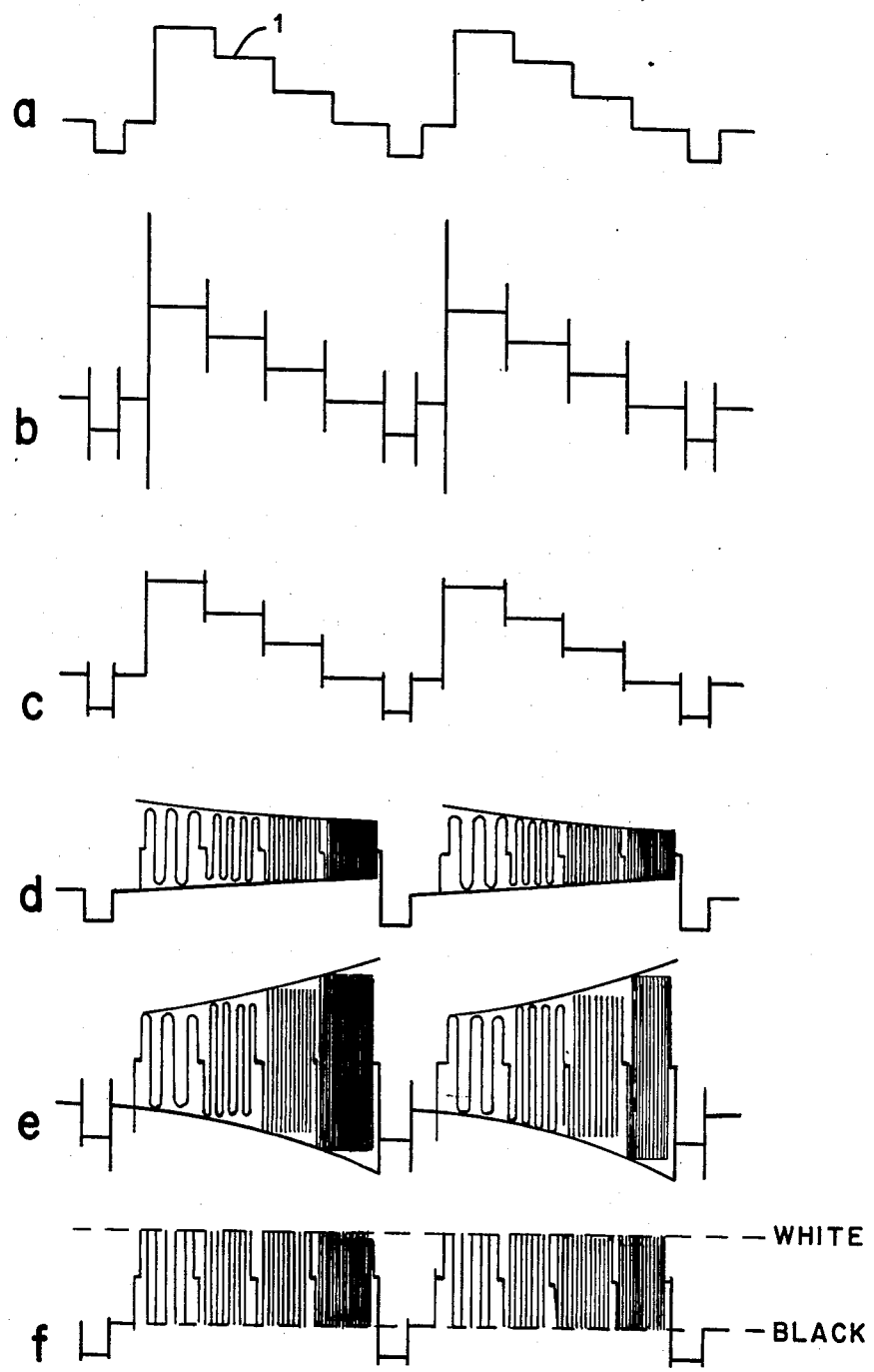
FIG. 3 is a schematic view of curves for illustrating the mode of operation of the circuit according to FIG. 1

FIG. 3 illustrates a video signal processed with a conventional differential equalizer. It can be recognized that at the jumps of the signal there occur interfering voltage peaks which extend beyond the white level value and the black level value and which can interfere with the synchronization.

The composite video signal (BAS) processed according to the invention is shown in FIG. 3c based on a gray scale. Large and small amplitude jumps are approximately equally increased in slope, and an overemphasis of larger amplitude jumps as shown in FIG. 3b no longer occurs.

A so-called multi-burst signal is illustrated in FIG. 3d. During the line scanning period the video signal comprises four oscillation packets with each at a singular video frequency, that is, 1 MHz, 2 MHz, 3 MHz and 4 MHz. A decrease of the amplitudes at higher frequencies occurs because of the effective frequency course of the transmission pack. This signal would be present at the terminal 10 according to FIG. 1, if no correction signal 21 was added.

FIG. 3e shows a view of a corrected video signal. Due to the operation of the high pass filter 40, an increase of the magnitudes of the amplitudes is generated at high frequencies, which is again undesired. The amplitude of the correcting signal 21 is adjusted with the potentiometer 48 such that the signal according to 3e shows an approximately constant amplitude with frequency in the case of a extremely decreasing frequency course in the video signal 1. In the case of a lesser decrease of the frequency course, there is generated the amplitude increase of the corrected video signal according to FIG. 3e, increasing toward higher frequencies.

The corrected video signal is shown in FIG. 3f, and the amplitude of the corrected video signal is limited to the black level value and for the white level value by the two amplitude limiters 42 and 43 in FIG. 1. It can be recognized that the video signal assumes the full amplitude region between black and white as desired. However, no signal parts extend in an undesirable way beyond the white value or the black value. In addition to the correction of the amplitude, an impulse reforming of the sinusoidal oscillation in FIGS. 3d and 3e into approximately rectangular oscillations according to FIG. 3f is performed by the limiting. An additional increase in the sharpness of the pictures results from this, in particular with respect to the vertical edges.

The components which correspond to respective components of FIG. 1 are shown in FIG. 4 with the same reference numerals. The addition of the video signal 1 to the correction signal 21 is provided at the base of the transistor Tr7 forming the adding stage 7. The clamping stage 41 is formed by the diode 50 and the transistor 51 and operates as follows. Upon occurrence of a video signal initially the diode 50 operates as a clamping diode, and it cuts off the negatively directed synchronizing pulses to the constant direct current voltage at the emitter of the transistor 51. Once the circuit is running, the synchronizing pulses S are separated with the separating stage 46, pass via the reversing stage 47 to the base of the transistor 51 and control this transistor during the line fly back time such that it is conducting. The clamping with the switched transistor 51 is associated with the advantage that a transistor in the conducting state has less resistance and lower residual voltage than a diode. The negatively directed synchronizing pulses −S are still present at the collector of the transistor 51, and they are evaluated with a separating stage 46. The synchronizing pulses are eliminated by the limitation to the black level value in the amplitude limiter circuit 42. Therefore the synchronizing pulses −S at the output of the separating stage 46 are again added in the adding stage 44 formed by the transistor Tr2.

It will be understood that each of the elements described above, or two or more together, may also find a useful application in other types of system configurations and circuits for increasing the slopes of a video signal differing from the types described above.

While the invention has been illustrated and described as embodied in the context of a circuit for increasing the slopes of a video signal, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A circuit for increasing the steepness of the rise of the pulses of a video signal comprising
    an amplifier having an input for receiving a video signal requiring correction and having an output;
    a first differential stage having an input connected to the output of the amplifier and having an output;
    a high pass filter having an input connected to the output of the first differential stage, providing an amplitude increase with increasing frequencies, and having an output;
    a first adding stage having an input connected to the output of the high pass filter and having an input connected to an output of the amplifier and having an output;
    first amplitude limiting means connected to the output of the first adding stage for limiting a corrected output signal to a black level value and to a white level value.

2. The circuit for increasing the steepness of the rise of the pulses of a video signal according to claim 1 wherein the amplitude limiting means includes two amplitude limiting members.

3. The circuit for increasing the steepness of the rise of the pulses of a video signal according to claim 1 further comprising
    second amplitude limiting means having its input connected to the output of the first differential stage and having its output connected to the high pass filter.

4. The circuit for increasing the steepness of the rise of the pulses of a video signal according to claim 2 further comprising
    third amplitude limiting means having its input connected to the output of the high pass filter and having its output connected to the first adding stage.

5. The circuit for increasing the steepness of the rise of the pulses of a video signal according to claim 1 further comprising
    second amplitude limiting means having its input connected to the output of the first differential stage and having its output connected to the high pass filter;
    a second differential stage having an input connected to the output of the high pass filter such that the high pass filter is disposed between the first and the second differential stage and the second differential stage having an output; and
    third amplitude limiting means having its input connected to the output of the high pass filter via the second differential stage and having its output connected to the first adding stage.

6. The circuit for increasing the steepness of the rise of the pulses of a video signal according to claim 1 further comprising
    a clamping stage having an input connected to the first adding stage and having an output connected to an input of the amplitude limiting means.

7. The circuit for increasing the steepness of the rise of the pulses of a video signal according to claim 6 wherein the clamping stage comprises a clamping diode and a transistor disposed in parallel to the clamping diode, which is controlled in its conductance by separated synchronous pulses.

8. The circuit for increasing the steepness of the rise of the pulses of a video signal according to claim 1 further comprising
    means for separating synchronizing pulses having an input connected to the output of the first adding stage and having an output; and
    a second adding stage having an input connected to the output of the amplitude limiting means and having and input connected to the output of the means for separating synchronizing pulses in order to join the synchronizing pulses to the corrected signal.

9. The circuit for increasing the steepness of the rise of the pulses of a video signal according to claim 8 further comprising
    a second amplifier having an input connected to an output of the second adding stage.

10. The circuit for increasing the steepness of the rise of the pulses of a video signal according to claim 8 further comprising
    a reversing stage having an input connected to the means for separating synchronizing pulses and having an output; and
    a clamping stage having an input connected to the first adding stage and having an input connected to the reversing stage and having an output connected to an input of the amplitude limiting means and to the means for separating synchronizing pulses.

11. The circuit for increasing the steepness of the rise of the pulses of a video signal according to claim 1 wherein a lifting of the amplitude level for increasing frequencies amounts to from about 2 to 10 dB for about a tripling of the frequency from about 1 mHz to 3 mHz.

12. The circuit for increasing the steepness of the rise of the pulses of a video signal according to claim 1 further comprising
    a delay time member having an input connected to an output of the amplifier and having an output connected to the first adding stage.

13. The circuit for increasing the steepness of the rise of the pulses of a video signal according to claim 1 wherein the amplitude limiting means comprises one section for limiting the black level value and a second section for limiting the white level value.

14. The circuit for increasing the steepness of the rise of the pulses of a video signal according to claim 1 further comprising
an amplitude adjustment means disposed in the connection between the high pass filter and the first adding stage.

15. The circuit for increasing the steepness of the rise of the pulses of a video signal according to claim 1 wherein the high pass filter comprises a network where one line incorporates a resistor which is bypassed by a series connection of a capacitance and another resistor and where a further resistor is provided between said line and the ground.

16. A method for increasing the steepness of the rise of the pulses of a video signal comprising
differentiating a video signal in a first differential stage;
filtering with a high pass filter the output of a first differential stage for lifting the amplitudes of a signal at higher frequencies;
differentiating the output of the high pass filter in a second differentiating stage for obtaining a correction signal;
adding the correction signal to a video signal in an adding stage to provide a corrected signal; and
limiting the corrected signal with two amplitude limiting means to a black level value and to a white level value.

17. The method for increasing the steepness of the rise of the pulses of a video signal according to claim 16 further comprising
clamping the corrected signal in a clamping stage to a synchronizing level before the signal reaches the amplitude limiting means.

18. The method for increasing the steepness of the rise of the pulses of a video signal according to claim 16 further comprising
feeding the corrected signal through a clamping stage via a clamping diode and a transistor disposed in parallel to the diode, where the transistor is maintained in a conducting state by synchronizing pulses removed by limiting the signal to a black level value.

19. The method for increasing the steepness of the rise of the pulses of a video signal according to claim 16 further comprising adding synchronizing pulses removed by limiting the signal to the black level value again to the corrected signal after the signal has passed the amplitude limiting means.

20. The method for increasing the steepness of the rise of the pulses of a video signal according to claim 16 wherein the lifting of the amplitude in the range of 1 to 3 mHz amounts to from about 3 to 5 dB.

* * * * *